(12) United States Patent
Patterson et al.

(10) Patent No.: US 8,036,640 B2
(45) Date of Patent: Oct. 11, 2011

(54) APPARATUS, AND ASSOCIATED METHOD, FOR FACILITATING ROUTING OF DATA IN A RADIO COMMUNICATION SYSTEM HAVING A MOBILE NODE CAPABLE OF ROAMING MOVEMENT

(75) Inventors: Ian M. Patterson, Petersburg (CA); Richard Betel, Toronto (CA); Adrian Rogobete, Waterloo (CA); Ken Axtmann, Kitchener (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 12/914,868

(22) Filed: Oct. 28, 2010

(65) Prior Publication Data

US 2011/0044252 A1 Feb. 24, 2011

Related U.S. Application Data

(63) Continuation of application No. 12/628,638, filed on Dec. 1, 2009, now Pat. No. 7,826,826, which is a continuation of application No. 12/044,478, filed on Mar. 7, 2008, now Pat. No. 7,650,141, which is a continuation of application No. 10/782,528, filed on Feb. 19, 2004, now Pat. No. 7,362,730.

(51) Int. Cl.
*H04M 3/16* (2006.01)
*H04W 4/00* (2009.01)

(52) U.S. Cl. ............... 455/411; 455/432.1; 455/435.1; 370/331

(58) Field of Classification Search .............. None
See application file for complete search history.

(56) References Cited

U.S. PATENT DOCUMENTS

| | | | |
|---|---|---|---|
| 5,497,412 | A | 3/1996 | Lannen et al. |
| 6,256,497 | B1 | 7/2001 | Chambers |
| 6,567,664 | B1 | 5/2003 | Bergenwall et al. |
| 6,615,041 | B2 | 9/2003 | Adamany et al. |
| 6,636,498 | B1 | 10/2003 | Leung |
| 6,735,429 | B1 | 5/2004 | Adamany et al. |
| 7,362,730 | B2 | 4/2008 | Patterson et al. |
| 7,650,141 | B2 * | 1/2010 | Patterson et al. .......... 455/414.1 |
| 7,826,826 | B2 * | 11/2010 | Patterson et al. ............. 455/411 |
| 2002/0061746 | A1 | 5/2002 | Jo et al. |
| 2004/0156495 | A1 | 8/2004 | Chava et al. |
| 2005/0101323 | A1 | 5/2005 | De Beer |

* cited by examiner

*Primary Examiner* — Erika Gary

(57) ABSTRACT

Apparatus, and an associated method, for providing routing information to a mobile node operable in a radio communication system. The routing information is used by the mobile node to address data messages that are to be communicated to a relay host, or other, device. The routing information that is provided to the mobile node includes a plurality of separate routing sequences. Different ones of the routing sequences are used by the mobile node, depending upon at what location that the mobile node is positioned when the data message is sent. A registration server is used by which to create the routing information, responsive to indications of a home network associated with the mobile node and a current location of the mobile node.

9 Claims, 3 Drawing Sheets

APPARATUS, AND ASSOCIATED METHOD, FOR FACILITATING ROUTING OF DATA IN A RADIO COMMUNICATION SYSTEM HAVING A MOBILE NODE CAPABLE OF ROAMING MOVEMENT

CROSS-REFERENCE TO RELATED APPLICATION

This application is a continuation of, claims benefit of, and incorporates by reference U.S. patent application Ser. No. 12/628,638 titled "Apparatus, and Associated Method, for Facilitating Routing of Data in a Radio Communication System Having a Mobile Node Capable of Roaming Movement", filed on Dec. 1, 2009, now U.S. Pat. No. 7,826,826, which is a continuation of U.S. patent application Ser. No. 12/044,478 filed on Mar. 7, 2008, now U.S. Pat. No. 7,650,141, which is a continuation of U.S. patent application Ser. No. 10/782,528 filed on Feb. 19, 2004, now U.S. Pat. No. 7,362,730.

The present invention relates generally to a manner by which to facilitate routing of data generated by a mobile node operable in a radio communication system, such as a cellular communication system that provides for data communication services. More particularly, the present invention relates to apparatus, and an associated method, by which to determine routing information to be used to route data originated at the mobile node to effectuate a data communication service.

The routing information includes substantially all of the information needed by the mobile node to route data to be communicated therefrom when the mobile node is positioned within the coverage area of any part of the radio communication system. The routing information is determined and provided to the mobile node upon the mobile node's registration with the network. The routing information includes information that can be used later by the mobile node when later positioned at another location. A subsequent request for new routing information when the mobile node is positioned subsequently at another location is obviated as the routing information initially provided to the mobile node includes routing information that might subsequently be needed when the mobile node is subsequently repositioned.

BACKGROUND OF THE INVENTION

The use of modern communication systems through which to communicate information to effectuate communication services is a practical necessity of many aspects of modern society. Various types of communication systems have been developed and deployed, used pursuant to the effectuation of varied types of communication services. With continued technological advancements, new types of communication systems continue to be developed and deployed. The technological advancements, when implemented in a communication system, generally provide for the communication of data at increased transmission rates and at, and between, locations at, or between which, such communications had not been practically possible.

Advancements in digital communication technologies are amongst the technological advancements that have been included in many modern communication systems. Various advantages are provided when digital communication techniques are used in a communication system. For instance, the ability to provide improved communication efficiencies is possible by removing communication redundancies in the transmitted data. And, when data is digitized, the digitized data can be communicated during discrete intervals. Circuit-switched connections need not be used; instead, shared channels, such as packet-switched channels, can be defined and used upon which to communicate the data.

A radio communication system is an exemplary type of communication system. In a radio communication system, data is communicated between communication stations to effectuate a communication service upon radio channels. Radio channels are defined upon radio links that form parts of the electromagnetic spectrum. Many radio communication systems use digital communication techniques pursuant to the communication of data between the communication stations of a radio communication system. The use of digital communication techniques in which communication redundancies are removed out of the data prior to its communication is particularly advantageous in a radio communication system due to the bandwidth limitations regularly associated therewith. That is to say, the bandwidth of the radio channels available upon which to communicate data is limited. And, the communication capacity of many radio communication systems are limited by the bandwidth capacity of the radio channels. The communication capacity is increased by increasing the efficiency of the manner by which the data is communicated upon the radio channels.

Various advantages are provided by radio communication systems, in contrast to their wireline counterparts. Costs associated with the initial installment and deployment of a radio communication, for instance, are generally less than the corresponding costs required to install and to deploy a counterpart wireline system. Additionally, and significantly, a radio communication system is implementable as a mobile communication system. In a mobile communication system, one or more of the communication stations is mobile, viz., permitted mobility.

A cellular communication system is a type of radio communication system, the networks of which have been installed over significant portions of the populated areas of the world. Successive generations of cellular communication systems have been developed and deployed. Many of such systems are popularly utilized, in some areas approaching, or even exceeding, the levels of usage of their wireline counterparts.

Cellular communication systems increasingly are utilized to permit high speed data services to be effectuated therethrough. Data messaging services are amongst the communication services that increasingly are effectuated through operation of a cellular communication system.

A mobile node positioned within the coverage area encompassed by a cellular communication system sends, or receives, data forming the data messages. Data messages that are to be terminated at the mobile node are sent by the network part of the communication system by way of a down-link, or forward-link, channel to the mobile node. And, data messages originated at the mobile node are transmitted upon an up-link, or reverse link, channel to the network part.

In order for the data messages to be communicated successfully, the messages must be routed through the network to their destination, i.e., the mobile node or another communication station. Due to the mobility inherent of the mobile node, the routing of data messages are dependent upon the location of the mobile node when the data message is to be communicated. Appropriate routing information is required, e.g., at the mobile node to identify the route by which a data message originated thereat is to be communicated. The routing information needed to be used differs, depending upon with what portion of the network of the cellular communication system that the mobile node communicates. When the mobile node roams beyond the area encompassed by its home network, e.g., the mobile node must communicate by way of a non-home network. In order for the mobile node to be permitted to communicate by way of the non-home network, the operators of the respective networks must have in place arrangements that provide for access to the mobile node to communicate by way of the non-home network. Agreements between the operators to permit such communication are sometimes referred to as being roaming agreements. In areas that are encompassed by more than one cellular communication system, a roaming agreement might be in place between the operator of the home network of the mobile node and one, but not another, of the non-home networks. In order to send the data message, the message must be communicated by way of the non-home network whose operator maintains a roaming, or other appropriate agreement, with an operator of the home network of the mobile node. Tunneled, or non-tunneled, communication paths are used, depending upon the structures of the networks through which the data message is to be routed as well as the agreements between the operators of the networks.

In short, routing information that is required to communicate a data message is dependent upon the location of the mobile node when the data message is communicated. Providing the mobile node with routing information, albeit necessary to permit the communication of data message therefrom, conventionally requires mobile-node registration and re-registration to ensure that the routing information is current and accurate. This conventional need to perform multiple registrations is sometimes unwieldy.

If a manner could be provided by which better to determine and provide to the mobile node routing information to be used by the mobile node to route data pursuant to a data communication service when the mobile node is positioned at any location encompassed by a radio communication system, improved communication operations would result.

It is in light of this background information related to communication of data in a radio communication system that the significant improvements of the present invention have evolved.

SUMMARY OF THE INVENTION

The present invention, accordingly, advantageously provides apparatus, and an associated method, by which to facilitate routing of data generated by a mobile node operable in a radio communication system, such as a cellular communication system that provides for data communication services.

Through operation of an embodiment of the present invention, a manner is provided by which to determine routing information to be used to route data originated at the mobile node to effectuate a data communication service. Routing information is determined and provided to the mobile node, thereby to provide the mobile node with information necessary to route data when the mobile node is positioned at any of many locations encompassed by the cellular communication system.

Substantially all of the information needed by the mobile node to route the data that is to be communicated therefrom when the mobile node is positioned at any of various locations encompassed by a radio communication system is contained in the routing information that is provided to the mobile node. The routing information is determined and provided to the mobile node upon registration of the mobile node with the network. The routing information includes information that is usable immediately by the mobile node, immediately to send data messages from the location at which the mobile node is positioned as well as, subsequently, later to send data messages when the mobile node is positioned at other locations. A subsequent request for new routing information when the mobile node is positioned subsequently at another location is obviated as the routing information initially provided to the mobile node includes the routing information that is subsequently used to route data through the network of the communication system when positioned at a subsequent location.

In one aspect of the present invention, a method is provided by which to handle a multiplicity of carrier associations amongst a multiplicity of carriers, with a multiplicity of inter- and intra-relationships that determines routing information responses that are to be returned to a mobile node. The routing information is subsequently used at the mobile node to route data that is communicated by the mobile node. The relationships between the different carriers, i.e., operators, of the different networks collectively forming the cellular communication system, and their respective operating relationships therebetween are determinative of the routing that is to be used by the mobile node to communicate the data messages. Due to the potential multiplicity of relationships between the various carriers and multiple possibilities of data routing, the number of routing possibilities, as a function of the position at which the mobile node is located, is potentially significant. Determinations are made of the various possibilities and the routing information of the various possibilities is provided to the mobile node, such as during initial registration of the mobile node.

Thereby, upon registration, the mobile node is provided with the routing information to permit seamless transitions between different partnered carriers when the mobile node roams beyond its home network. Seamless transitions are also provided to areas operated by disjoint carriers. Because the routing information to permit appropriate routing of data messages by the mobile node when positioned at any of various locations is provided to the mobile node at one time, repeated requests for routing information or registrations precipitating downloading of routing information, is obviated.

Further through operation of an embodiment of the present invention, the routing information is formed and sent to the mobile node as part of a registration-request response. That is to say, the mobile node generates a registration request, such as at initiation of a communication session or upon initial powering of the mobile node. The registration response information includes the routing information that comprises all of the necessary routing information, including that associated with partnered carrier associations. This information includes provisions for tunneled and non-tunneled roaming agreements, uni-directional roaming, and intra-net routing changes within sub-network portions of a network operated by a single carrier or operator.

In another aspect of the present invention, the routing information is determined at a registration server to which a registration, or other request, generated by the mobile node is routed. The request generated by the mobile node includes indicia associated with a home network associated with the mobile node as well as indicia associated with the network through which the mobile node presently communicates. Responsive to this information, determinations are made at the registration server of various routing paths by which to route data, depending upon the location of the mobile node. Once the various routing information is determined, the routing information is communicated to the mobile node. The routing information is stored at the mobile node, and used, as necessary, subsequently to route data messages that are originated at the mobile node.

Thereby, simplified communication procedures are provided by which to provide the mobile node with routing information that is to be used by the mobile node to address, or otherwise cause the routing of, the data messages to a desired relay device.

In these and other aspects, therefore, apparatus, and an associated method, is provided for a radio communication system. The radio communication system has a mobile node operable to communicate data by way of a radio link with a fixed network. The mobile node is associated with a home network provider that provides communication services for communication with the mobile node when the mobile node is positioned to communicate with a first portion of the fixed network, and the mobile node is permitted mobility, selectably to be positioned to communicate with at least at a second portion of the fixed network. Communication services are provided at the at least the second portion of the fixed network by at least one non-home network provider. Determination of routing information by which to route the data communicated to the mobile node, when positioned to communicate with any of the first and at least second portions of the fixed network, is facilitated. A registration request detector is adapted to receive indications of a registration request generated by the mobile node. The registration request detector detects values of the registration request. At least a first table is accessible at least responsive to detection by the registration request detector of the values of the registration request. The first table contains routing information indexed together with indicia associated with selected values of the registration request. A routing determiner is adapted selectably to receive indications of selected routing information contained in at least the first table. The routing determiner is responsive, at least in part, to the routing information to determine the routing by which the data is to be communicated by the mobile node. The routing determined by the routing determiner is usable by the mobile node when positioned to communicate with the any of the first and at least second portions of the fixed network.

A more complete appreciation of the present invention and the scope thereof can be obtained from the accompanying drawings that are briefly summarized below, the following detailed description of the presently-preferred embodiments of the invention, and the appended claims.

DETAILED DESCRIPTION

Figure 1:
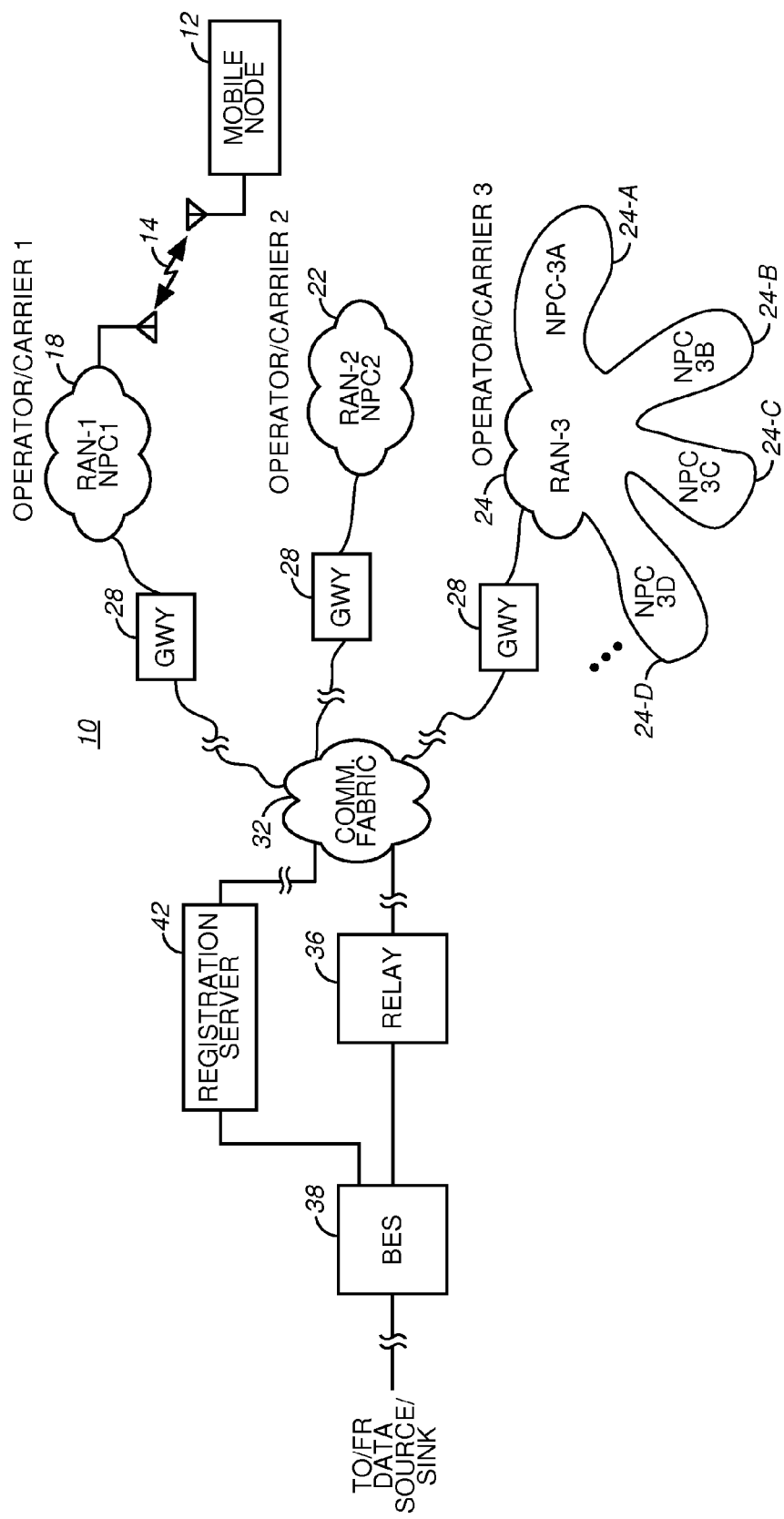
FIG. 1 illustrates a functional block diagram of a radio communication system in which an embodiment of the present invention is operable.

Referring first to FIG. 1, a digital radio communication system, shown generally at 10, provides for the effectuation of communication of data messages with mobile nodes, of which the mobile node 12 is representative. The data messages are communicated to, and from, the mobile node by way of radio channels, here represented by the arrow 14, defined upon a radio air interface. Data messages originated at the mobile node are communicated to a network part of the communication system by way of reverse-link, or up-link, channels defined upon the radio air interface. And, data messages originated at the network part of the communication system are communicated to the mobile node by way of forward-link, or down-link, channels defined upon the radio air interface.

Due to the inherent mobility of the mobile node, the mobile node is positionable at successive times, at successive positions. The position at which a mobile node is located when a data message is to be communicated therefrom, or is to be received therefrom, is, in significant part, determinative of which portion of the network part of the communication system with which the mobile node communicates. Different network parts, sometimes operated by different network operators, are deployed over differing geographical areas. And, differing network parts, operated by differing network operators, are sometimes deployed to encompass substantially, or completely, overlapping geographical areas with which one of the network portions is a preferred portion to be used to effectuate communication of the data messages with the mobile node. And, a single network part is sometimes further subdivided into sub-parts. And, the mobile node communicates with an appropriate sub-part of the network part.

The network part shown in figure of the communication system 10 is exemplary and is here shown to include a first radio access network (RAN-1) 18, a second radio access network (RAN-2) 22, and a third radio access network (RAN-3) 24. The separate radio access networks are representative of separate portions of the network part of the communication system. Each of the radio access networks is operated by a different operator or carrier. The radio access networks 18 and 22 are representative, alternately, of network portions that are deployed over separate geographical areas and of network portions that are overlaid upon one another but operated by separate operators. And, the third radio access network 24 includes sub-portions, here sub-portions 3A, designated at 24-A, 3B, designated at 24-B, 3B, designated at 24-C, and 3D, designated at 24-D.

In the illustration of the figure, the mobile node 12 is positioned in proximity to the first radio access network 18. Movement of the mobile node permits its positioning subsequently at other locations, such as locations in proximity to the second and third radio access network. Communications with, and by, of the data messages are generally effectuated with the portion of the network part in whose proximity that the mobile node is positioned.

The first radio access network 18 has a network provider code (NPC), NPC1, associated therewith. The second radio access network has a second network protection code, NPC2, associated therewith. And, each of the sub-portions of the third radio access network 24 has a network provider code associated therewith. That is to say, the sub-portion 24-A has a network provider code NPC3A associated therewith; the sub-portion 24-B has a network provider code NPC3B associated therewith; the sub-portion 24-C has a network provider code NPC3C associated therewith; and the fourth sub-portion 24-D has a network provider code NPC3D associated therewith.

The network provider codes each form unique value sequences, or otherwise are of values that uniquely identify the network portions or sub-portions with which the codes are associated. A mobile node is associated with a particular portion or sub-portion of the network part of the communication system. Such portion is referred to as the home network of the mobile node. Due to the aforementioned mobility of the mobile node, the mobile node is positionable, not only to communicate with the home network of the mobile node when the mobile node is positioned in proximity thereto but, alternately, to communicate with other portions or sub-portions of the network part of the communication system when the mobile node is positioned out of proximity with its home network. The network provider code of the home network of the mobile node is referred to as the home NPC while the network provider code of the portion of the network part with which the mobile node is positioned when communications are to be effectuated therewith is referred to as the current network provider code, the current NPC.

Gateways (GWYs) connect the radio access networks to a communication fabric 32. The communication fabric is here representative of any communication network or mechanism through which data messages, for delivery to a mobile node, or communicated by a mobile node is routable.

The network part of the communication system further includes a relay 36 that is coupled, by way of the communication fabric and an appropriate gateway to a radio access network with which the mobile node communicates. And, the relay, in turn, is coupled to a server 38, here a Blackberry™ Enterprise server (BES). Data messages originated at, or otherwise provided to, the server 38 for delivery to a mobile node 12 are routed by way of the relay 36 to an appropriate radio access network and communicated by way of radio channels defined upon a radio air interface extending to the mobile node, thereby to deliver to the mobile node the data message.

A registration server 42, operable pursuant to an embodiment of the present invention is positioned in parallel with the relay 36. The registration server 42 is identified with a fixed address, e.g., a fixed IP (Internet Protocol) address, and maintains connectivity by way of the communication fabric and the gateways, to each of the radio access networks, here represented by the three radio access networks 18, 22, and 24. During operation, the registration server provides to a mobile node information relay host routing information. The relay host routing information provides routing information to the mobile node to inform the mobile node routing information needed to route data messages originated at the mobile node to the relay 36.

In the exemplary implementation, the routing information provided to the mobile node includes separate routing information to permit routing of data messages by the mobile node when positioned in a plurality of different locations. That is to say, the routing information that is provided to the mobile node includes separate routing sequences, individual sequences which are used by the mobile node depending upon the location of the mobile node when a data message is to be communicated by the mobile node. By downloading to the mobile node a plurality of different routing sequences of routing information, the information is available to the mobile node, and a separate request need not be made by the mobile node for the routing information when the mobile node moves between the coverage areas covered by separate network portions of the communication system. The routing information to be used by a mobile node such as to place in a header part of a packet-formatted message formed by the mobile node, is determined by various factors.

The home network associated with the mobile node, the current location of the mobile node, and roaming agreements between different network operators all are determinative of the routing information that is to be used by the mobile node. Dynamic determination of the routing information is determinable by the registration server. As roaming agreements change, indicia of such changes is provided to the registration server and such changes are evidenced in the routing information subsequently created by the registration server and forwarded to a mobile node. Timeliness of the information is also best assured.

Figure 2:
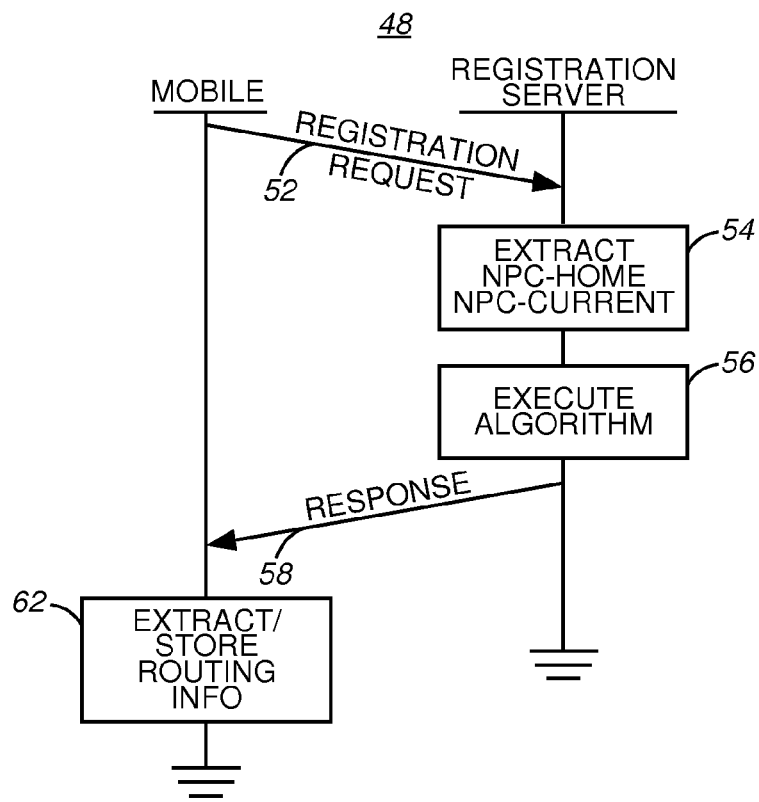
FIG. 2 illustrates a message sequence diagram of signaling generated in the radio communication system shown in FIG. 1 during exemplary operation of an embodiment of the present invention.

FIG. 2 illustrates a message sequence diagram, shown generally at 48, representative of exemplary signaling generated during operation of an embodiment of the present invention. Here, the mobile node initiates contact with the registration server 42 through the generation of a registration request that is sent, indicated by the segment 52, to the registration server. The registration request includes values that identify the home NPC of the home network associated with the mobile node together with a current NPC value of the radio access network with which the mobile node is currently positioned. The registration request is sent, by way of the radio air interface, a radio access network and the communication fabric to be delivered to the registration server. The registration server is identified with the fixed IP (Internet Protocol), or other, address, known to the mobile node, and such address is used to address and used to route the registration request to the registration server.

When the registration request is delivered to the registration server, the registration server extracts, as indicated by the block 54, the home NPC and current NPC information contained in the registration request. And, this extracted information is used at the registration server to determine routing information, sequences of which, when provided to the mobile node, are selectably used to route data messages to the relay 36. The routing information is determined through, in the exemplary implementation, execution of an algorithm, indicated by the block 56. Once the routing information is ascertained, a response message is formed, populated with the routing information. And, the response is returned, indicated by the segment 58, to the mobile node. Once delivered to the mobile node, and as indicated by the block 62, the routing information is extracted from the response and the extracted information is stored at the mobile node. When a data message is subsequently to be used to address data messages subsequently formed at the mobile node for communication to the relay 36. Once delivered and stored at the mobile node, the mobile node need not separately again request the information as the information is stored at the mobile node to permit routing of the data messages when the mobile node is positioned at any of various locations throughout the area encompassed by the communication system 10.

The registration server operates, responsive to delivery of the registration request, to form a mapping of NPCs to relay host routing information. This routing information when returned to the mobile node identifies to the mobile node that, for a given NPC, messages originated at the mobile node should be sent to a selected IP address, port, and access point. This permits messages formed at the mobile node to be routed to the relay, using different paths, based upon the NPC values. Thereby, when a single operator, such as the operator of the third radio access network, has associated therewith a plurality of NPCs, the NPCs are associated to a single relay host routing information entry. And, the NPCs of different operators, such as the operators of the first and second radio access networks 18 and 22, are associated to a single relay host routing information entry. And, if needed, the plurality of NPCs associated with a single operator are associated to more than one relay host routing information entry. And, more specifically, operation of the registration server pursuant to an embodiment of the present invention, provides dynamic mapping of NPCs to relay host routing information entries at registration of a mobile node based on the home NPC and the current NPC values contained in the registration request.

When the mobile node roams, messages are routable by an appropriate routing path based on any appropriate criteria, e.g., based upon whether a roaming agreement exists with a particular carrier. If a roaming agreement is in place between the home operator of the mobile node and the operator in whose coverage area the mobile node is positioned, the messages are able to be sent using direct connections of the two carriers. Otherwise, the messages are routed to the other wireless carrier by way of the relay.

In the exemplary implementation, three relay database tables are maintained and accessed to perform mapping operations at the registration server. The database tables are maintained at, or accessible by, the registration server. A first table, referred to as a carrier2NPC, contains carrier, NPC group, NPC, and description information.

A second table, a carrierHRT table includes service name, carrier, NPC group, APN, IP address, UDP, and UOS information.

And, a third table, a carrier association table contains carrier, carrier NPC group, partner, partner NPC group, and tunneled service information.

Figure 3:
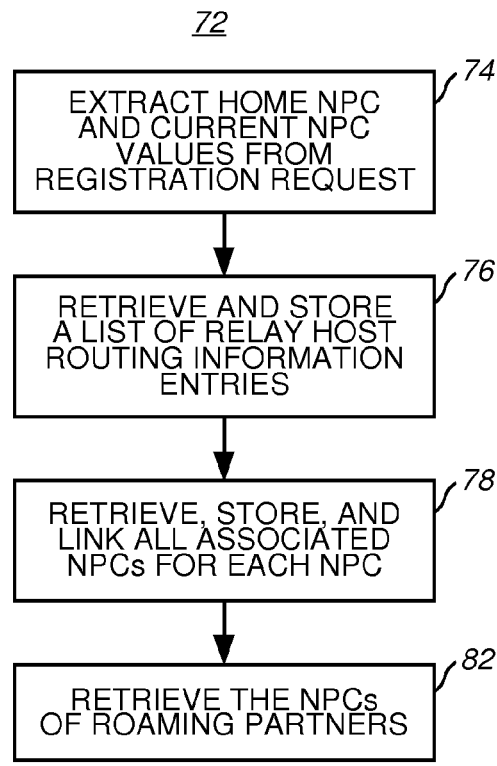
FIG. 3 illustrates a method flow diagram representative of the method steps carried out at the registration server forming part of the radio communication system shown in FIG. 1 during operation of an embodiment of the present invention.

FIG. 3 illustrates a method flow diagram shown generally at 72, representative of operation of the registration server to form the routing information to be downloaded to the mobile node. The method 72 in the exemplary implementation forms an algorithm whose execution forms the routing information.

First, and as indicated by the block 74, the home NPC and current NPC values contained in the registration request delivered to the registration server are extracted. Then, and as indicated by the block 76, a list of relay host routing information entries associated with the home NPC are retrieved and stored. And, thereafter, as indicated by the block 78, for each relay host routing entry, all associated NPCs are retrieved, stored, and linked.

Thereafter, and as indicated by the block 82, for each row, the NPCs of the roaming partners of the relay host routing entries are retrieved, stored, and linked therewith. The relay host routing information entries that are linked to the NPCs of the roaming partners are based on selected criteria. Namely, if tunneled service is available, the NPCs are associated with corresponding relay host routing information. Otherwise, the NPCs are associated with relay host routing information of the roaming partner.

Depending upon the type of system by which the radio access network is formed, the relay host routing information selectably differs. The relay host routing information is a set of data returned to the mobile node by the registration server. When the network is a GPRS, CDMA, or IDEN network, the relay host routing information contains at least the Internet Protocol address, port, access point name (APN), and quality of service values, values of all of which are selectably utilized by the mobile node, later to route a data message through a relay host.

Figure 4:
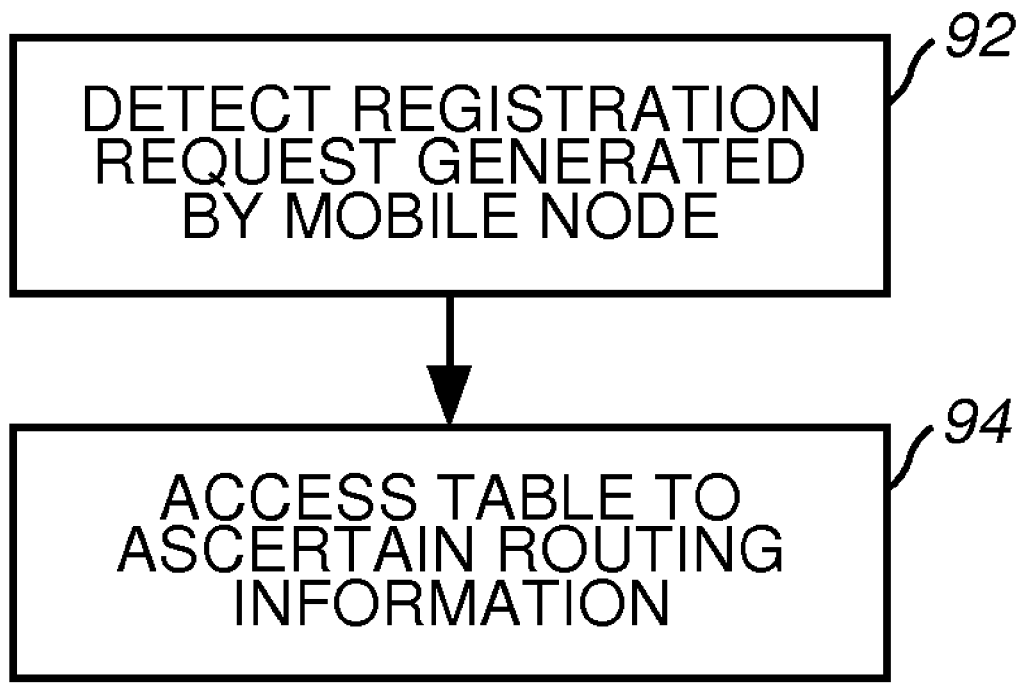
FIG. 4 illustrates a method flow diagram listing the method steps of the method of operation of an embodiment of the present invention.

FIG. 4 illustrates a method, shown generally at 88, of the method of operation of an embodiment of the present invention. The method facilitates determination of routing information by which to route data communicated by a mobile when the mobile node is positioned with any of a first and at least second portions of a fixed network.

First, and as indicated by the block 92, values of the registration request generated by the mobile node are detected. Then, and as indicated by the block 94, at least a first table is accessed to ascertain routing information indexed together with indicia associated with selected values of the registration request.

And, as indicated by the block 96, routing by which the data is to be communicated by the mobile node is determined. The routing is usable by the mobile node when positioned to communicate with any of the first and at least second portions of the fixed networks.

By providing the mobile node with various routing information, the mobile node is able to route a data message formed thereat to an appropriate relay host irrespective of the location at which the mobile node is positioned when the data message is to be communicated. A separate inquiry need not be made by the mobile node when the mobile node is repositioned to a new location to enquire of the routing information. Improved communication thereby results.

The previous descriptions are of preferred examples for implementing the invention, and the scope of the invention should not necessarily be limited by this description. The scope of the present invention is defined by the following claims:

The invention claimed is:

1. A method for a mobile node to route a data message formed thereat to a network by way of one of a plurality of network portions, the mobile node associated with a home network portion of the plurality of network portions, comprising:
    generating a registration request for the network in response to a triggering event, said registration request including an identification of the home network portion and an identification of a network portion with which the mobile node is currently in communication contact, whereby routing information is determined by the network;
    transmitting said generated registration request;
    receiving at the mobile node a response message populated by routing information from the network;
    extracting routing information from the received response message and storing said extracted routing information at the mobile node, said stored routing information identifying to the mobile node, for at least one network portion, an IP (Internet Protocol) address, port, and access point; and
    forming a data message subsequent to said storing for transmission to the network, said data message comprising said stored routing information.

2. The method of claim 1 wherein said routing information further comprises information needed to route mobile node originated messages to a relay portion of the network.

3. The method of claim 2 wherein said routing information further comprises information needed to route mobile node originated messages to said relay portion using different paths.

4. The method of claim 1 wherein said triggering event comprises an initial registration of the mobile node.

5. The method of claim 1 wherein the identification of the home network portion and the identification of the network portion with which the mobile node is currently in communication contact each comprise a unique network provider code (NPC).

6. The method of claim 1 wherein the routing information further comprises provisions for tunneled and non-tunneled roaming agreements between at least two of the network portions.

7. The method of claim 1 wherein the generated registration request is transmitted to a registration server portion of the network via a radio access portion of the network.

8. The method of claim 1 wherein said routing information further comprises individual routing sequences that are used by the mobile node depending upon which of the plurality of network portions the mobile node is currently in communication contact.

9. The method of claim 1 wherein said stored routing information comprising said data message further comprises a header part of said data message.

* * * * *